G. DOBBINS.
NUT LOCK.
APPLICATION FILED MAR. 24, 1917.

1,247,236. Patented Nov. 20, 1917.

WITNESS:
Bernard Privat

INVENTOR.
George Dobbins
BY
S. Webster
ATTORNEY.

UNITED STATES PATENT OFFICE.

GEORGE DOBBINS, OF STOCKTON, CALIFORNIA.

NUT-LOCK.

1,247,236. Specification of Letters Patent. Patented Nov. 20, 1917.

Application filed March 24, 1917. Serial No. 157,088.

*To all whom it may concern:*

Be it known that I, GEORGE DOBBINS, a citizen of the United States, residing at Stockton, in the county of San Joaquin, State of California, have invented certain new and useful Improvements in Nut-Locks; and I do declare the following to be a full, clear, and exact description of the same, reference being had to the accompanying drawings, and to the characters of reference marked thereon, which form a part of this application.

This invention relates to improvements in nut locks and is particularly designed as an improvement upon that type of nut locks shown in my Patent Number 1212918, filed June 19, 1916, Serial Number 104,432. The aim of the present invention is to provide an improved means for holding the spring clip from having longitudinal movement with respect to the bolt and thus allow the device to be applied to the common form of nuts without having to change the same in any degree.

A further object of the invention is to produce a simple and inexpensive device and yet one which will be exceedingly effective for the purposes for which it is designed.

These objects I accomplish by means of such structure and relative arrangement of parts as will fully appear by a perusal of the following specifications and claims.

In the drawings similar characters of reference indicate corresponding parts in the several views.

Figure 1:
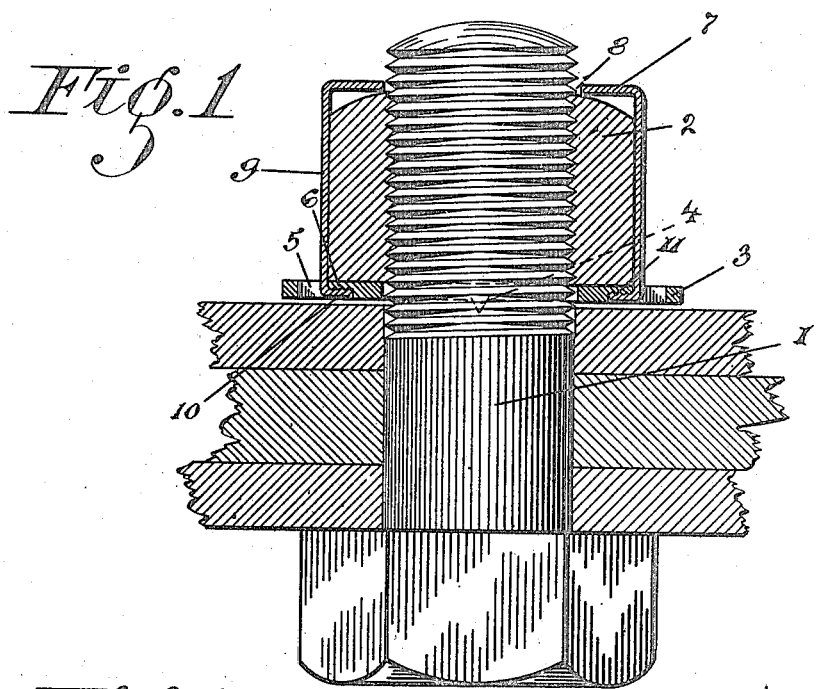
Figure 1 is a sectional view of my improved device as it appears when mounted upon the bolt.
Figure 2:
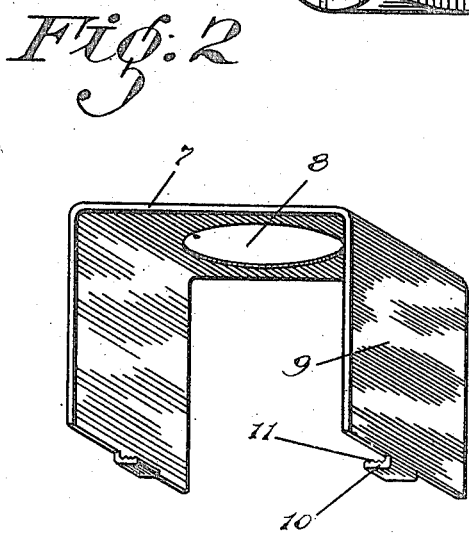
Fig. 2 is a perspective view of the spring retaining clip.
Figure 3:
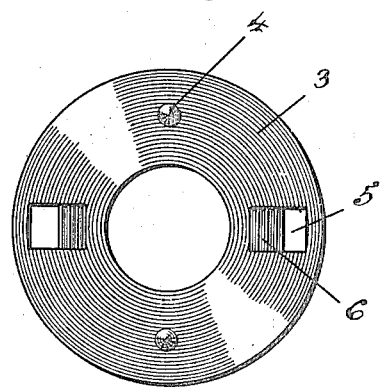
Fig. 3 is a bottom plan view of the washer.

Referring now more particularly to the characters of reference on the drawings the numeral 1 designates the bolt and the numeral 2, the nut mounted thereon. My improved locking means presents primarily a washer 3 arranged to be mounted over the bolt and is provided with depending sharp points 4 on its under face whereby the washer may be set against rotary motion on the bolt by driving these sharp points 4 into the parts against which the nut is to be tightened. The said washer 3 is provided with a pair of slots 5 extending therethrough, such slots communicating with recesses 6 in the underface of the washer 3, one side of such recesses being corrugated for a purpose as will presently appear.

When my improved lock is to be applied, the washer 3 is mounted over the bolt as shown in Fig. 1. The nut 2 is then screwed upon the bolt and against the washer 3 and tightened until the pins 4 are anchored in the parts to be bolted. A spring clip 7 provided with an orifice 8 is then fitted over the ends of the bolt and has spring sides 9 which are constructed to fit snugly against the sides of the nut 2. At the inner ends of the sides 9 are inwardly projecting lips 10 having one face thereof corrugated as at 11. As the clip 7 is fitted over the nut, these finger members 10 ride against the sides of the nut which hold the sides 9 sprung away from the nut. When the slots 5 are reached and the lips 10 projected therein the resiliency of the sides 9 force these lips into the recesses 6. This construction then holds the spring clip 7 against being moved longitudinally of the bolt or removed from engagement with the nut. Any possibility of the lips 10 shaking out of the slots 5 is overcome by the engagement of the corrugations 11 with the corrugations of the recesses 6.

When the clip 7 is mounted upon the nut in the manner just described the locking function is complete for the reason that the washer 3 cannot turn relative to the bolt nor can the clip member 7 since it is engaged with such washer and this in turn prevents the nut 2 from having rotary motion on the bolt for the reason that the sides 9 engage the sides of the nut 2.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A combination with a bolt, and a nut mounted thereon, of a washer mounted on the bolt and held against rotary motion thereon, said washer being provided with slots, the slots communicating with recesses in the under face of the washer, a spring clip mounted over the nut, inwardly projecting lips on the inner face of the clip, such lips being adapted to project through the slots and into the recesses to hold the clip against longitudinal movement with respect to the bolt.

2. A combination with a bolt, and a nut mounted thereon, of a washer mounted on the bolt and held against rotary motion thereon, said washer being provided with slots, the slots communicating with recesses in the under face of the washer, a spring clip mounted over the nut, inwardly projecting lips on the inner face of the clip, such lips being adapted to project through the slots and into the recesses to hold the clip against longitudinal movement with respect to the bolt, the lips and recesses having corrugated surfaces adapted to meet in face to face contact.

In testimony whereof I affix my signature.

GEORGE DOBBINS.